Dec. 6, 1955 W. T. ENGEL 2,725,901
AUTOMATIC APPARATUS FOR MAKING FINE GRID MESH
Filed Jan. 31, 1950 3 Sheets-Sheet 1
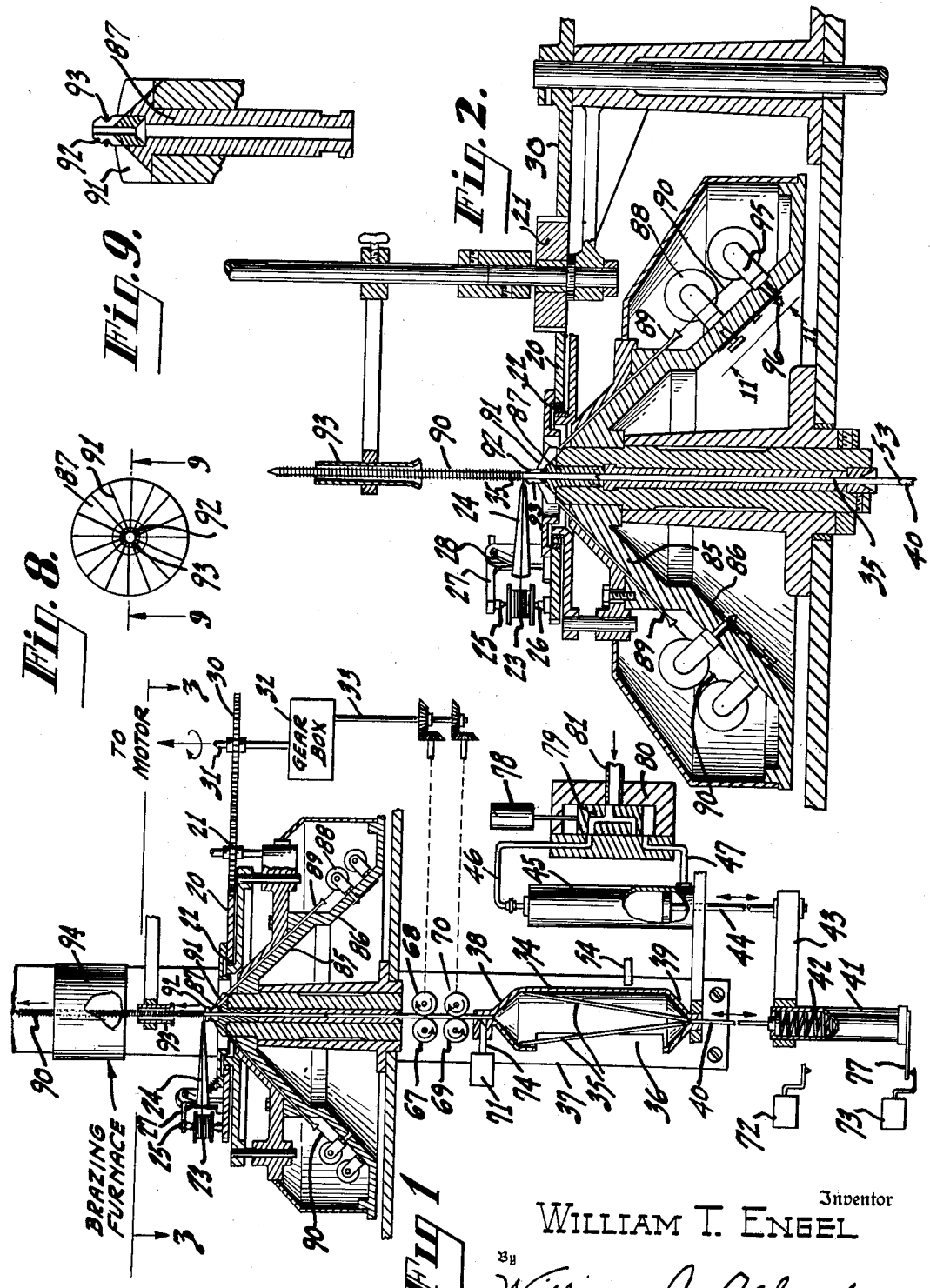
Inventor
WILLIAM T. ENGEL
By William A. Zalesak
Attorney Dec. 6, 1955 W. T. ENGEL 2,725,901
AUTOMATIC APPARATUS FOR MAKING FINE GRID MESH
Filed Jan. 31, 1950 3 Sheets-Sheet 2
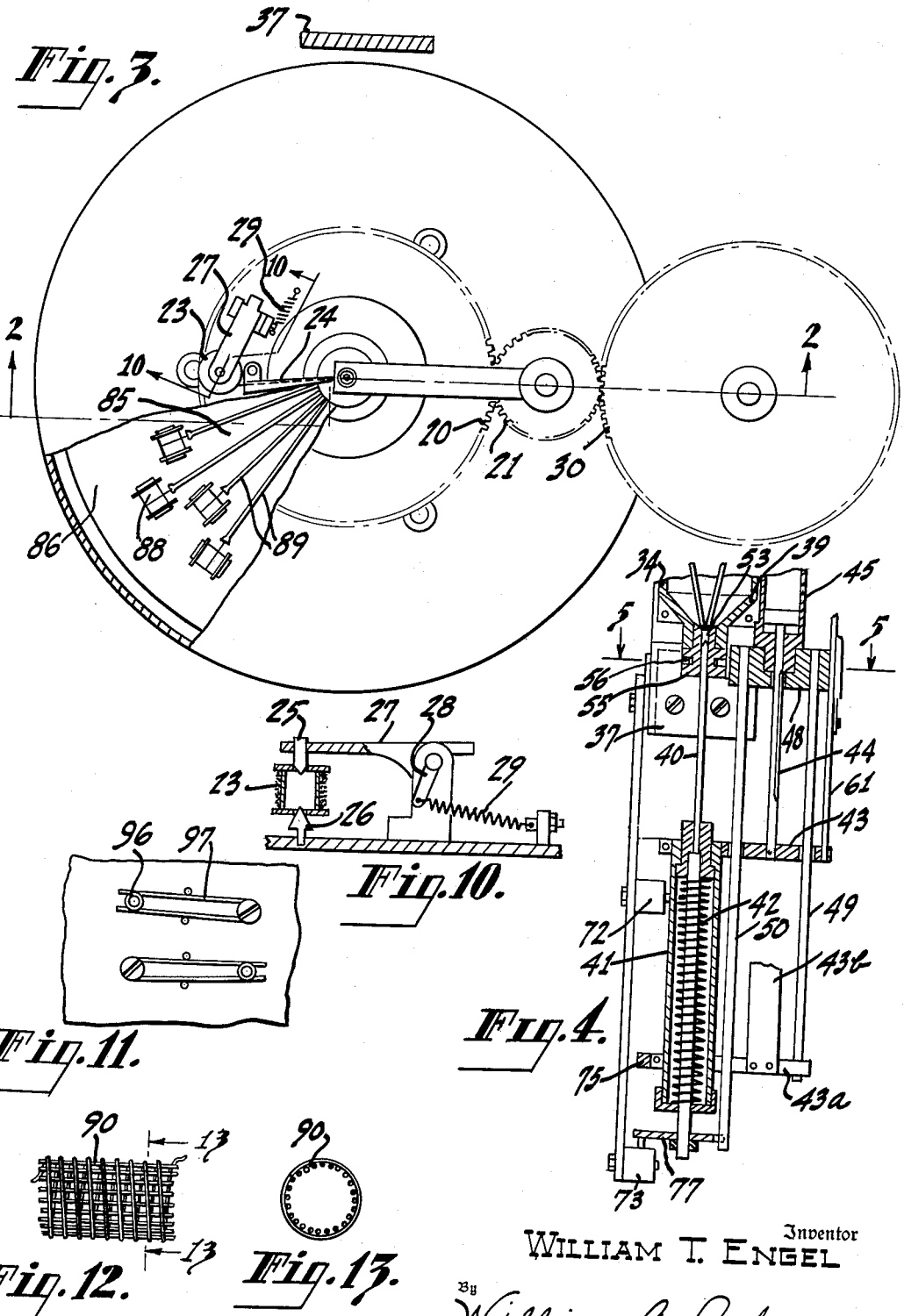
Inventor
WILLIAM T. ENGEL
By William A. Balesak
Attorney Dec. 6, 1955  W. T. ENGEL  2,725,901
AUTOMATIC APPARATUS FOR MAKING FINE GRID MESH
Filed Jan. 31, 1950  3 Sheets-Sheet 3
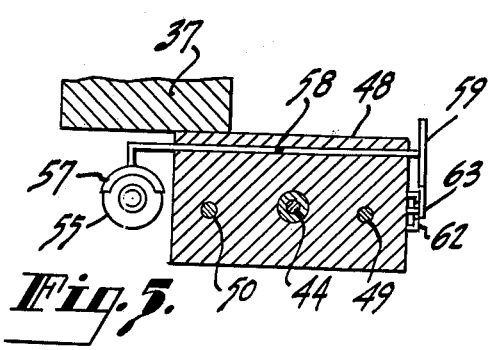
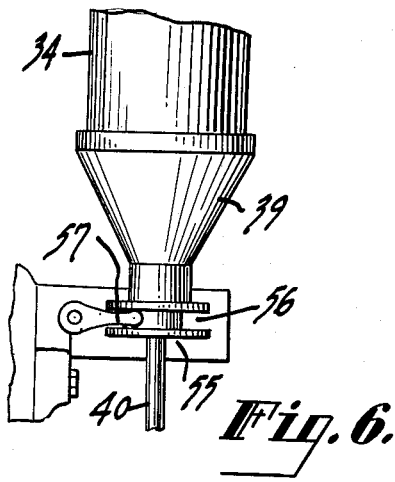
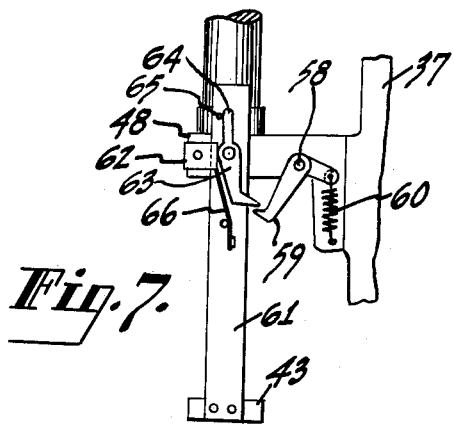
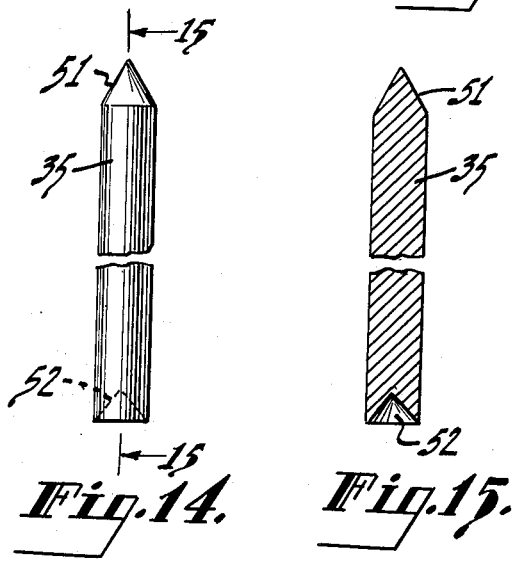
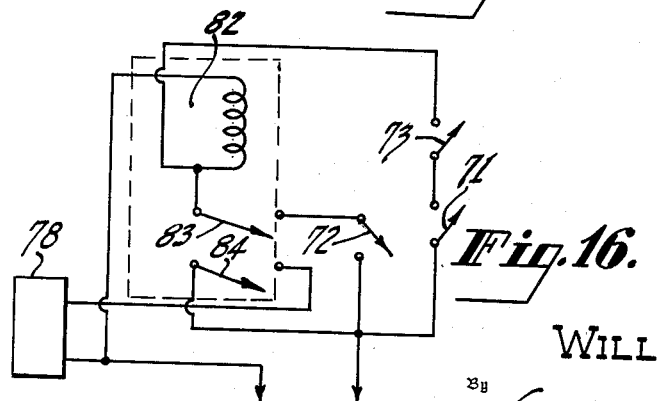
Inventor
WILLIAM T. ENGEL
By William A. Zalesak
Attorney

United States Patent Office 2,725,901
Patented Dec. 6, 1955

2,725,901

AUTOMATIC APPARATUS FOR MAKING FINE GRID MESH

William T. Engel, Union, N. J., assignor to Radio Corporation of America, a corporation of Delaware Application January 31, 1950, Serial No. 141,531

14 Claims. (Cl. 140—71.5)

The present invention relates to an apparatus for automatically making fine grid mesh and more particularly to feed means for feeding lateral wires for said mesh and a novel mandrel for providing an indefinite length of grid mesh.

The present invention represents an improvement on the grid making apparatus described and claimed in co-pending application of Julius Hirmann, Serial No. 140,429, filed January 25, 1950, and assigned to the same assignee as the present application. The apparatus there described is suited for making a fine grid mesh including a plurality of laterals or grid side rods around which a helix of grid wire is wound. However, that apparatus is not completely automatic in that the length of the grid made thereby is limited by the length of the mandrel used. Moreover, the disc support employed for the supplies of lateral grid wires causes enlargement of the grid making apparatus.

Accordingly it is the object of the invention to provide an improved apparatus for making relatively fine grid mesh.

Another object is to provide an improved apparatus for automatically making a grid of indefinite length.

A further object is to provide a grid making apparatus having a mandrel assembly for providing a mandrel of indefinite length.

Another object is to provide a reservoir of mandrel sections and means for automatically feeding said sections successively to a winding head for fabricating a grid of indefinite length.

A further object is to successively automatically self-align a plurality of mandrel sections for providing a mandrel of indefinite length.

Another object is to provide a mandrel assembly for a grid making apparatus having a limited length when stored and having an indefinite length when fed across the winding head of the apparatus whereby a grid of indefinite length may be fabricated by said apparatus.

A further object is to provide a grid making apparatus wherein a plurality of mandrel sections are supported in side by side relation for space economy and are automatically successively fed in end to end relation across a winding head for fabricating a grid of indefinite length.

Another object is to provide a combined lateral wire guide and support for supplies of said lateral wire in a grid making apparatus.

A further object is to support a plurality of supplies of lateral wires in spaced relation parallel to a line of feed of said wire to provide space economy on said support to permit support thereby of a relatively large number of said supplies without increasing the lateral extent of the apparatus excessively.

Another object is to support a plurality of supplies of lateral grid wire on a grid making apparatus in a conical array for space economy and to feed the lateral wire to a winding head of the apparatus in conically arrayed straight paths communicating with said supplies for preventing deformation of said wire during the feed thereof.

A further object is to provide a plurality of circular arrays of supplies of lateral wires in a grid making apparatus for providing a relatively large number of such supplies with reduced space requirements.

Another object is to provide a compact grid making apparatus capable of making a relatively fine grid mesh having a relatively large number of lateral wires and of indefinite length.

The foregoing and other objects and advantages of the invention are accomplished by a grid winding apparatus that includes an automatic mandrel feed for successively feeding from a readily refillable reservoir a plurality of mandrel sections in alignment in a predetermined path, a combined support for supplies of lateral grid wire and guide for drawing said lateral wire to said mandrel, and a winding head for winding grid wire around the lateral wires directed to the mandrel.

The automatic mandrel feed includes a vertically disposed housing or reservoir having outwardly extending conical ends with vertically aligned apertures in the apices therein. The housing is provided with an open side for receiving a plurality of mandrel sections. Extending into the aperture in the lower end of the reservoir is a mandrel feed member adapted to engage the lower end of one of the mandrel sections in the reservoir and push it upwardly through the aperture in the upper end of the reservoir. Agitating means are provided for assuring engagement between one of the mandrel sections and the mandrel feed member. The mandrel feed also includes means for gripping a mandrel section as it emerges from the upper aperture in the reservoir. The upper conical end of the reservoir guiding a mandrel section engaged by the feed member to said upper aperture. The gripping means continues the feed of the engaged mandrel section to the winding head. Each mandrel is provided with means at the ends thereof for engaging a successive mandrel section and for preventing lateral disengagement of engaged mandrel sections. In accordance with this feature of the apparatus of the invention the mandrel sections may be successively fed to the winding head in an indefinitely long array for providing a grid of indefinite length.

The combined support and guide for lateral grid wire comprises a cone-shaped member adjacent the wider end of which are mounted a plurality of supplies of lateral wire. To provide economy in space requirements, the supplies are disposed in several circular arrays spaced along the cone surface and staggered circumferentially of the cone. Slots are provided in the cone surface extending from the apex thereof toward the lateral wire supplies. The portion of the cone in which the slots are provided is preferably offset outwardly from the remainder of the cone surface to dispose the slots in substantially aligned arrays with respect to the lateral wire fed from lateral wire supplies. This prevents bending of the lateral wires between the supplies thereof and the path into which they are directed by the guide. The cone-shaped member is so disposed in relation to the winding head that its apex is relatively close to the plane in which the winding operation takes place to provide a substantially continuous restraint to deflections of the lateral wires in a predetermined path to the grid winding location. The cone-shaped member is also provided with an axial cylindrical space communicating with its apex and in alignment with the apertures in the mandrel housing, for receiving mandrel sections fed by the mandrel feed means.

In operation, the leading ends of the lateral wires are tied around the mandrel adjacent the apex of the lateral wire guide and the mandrel is continuously fed in sections across the winding head. The travel of the mandrel sections consequently pulls lateral wires from the supplies thereof to the mandrel. The winding head being adjacent the apex of the guide cone, applies grid wire to the lateral wires at a portion thereof relatively close to the restraining means of the guide. As a result, the grid turns engage lateral wires suitably oriented around the mandrel.

An additional guide may be provided for supporting the grid after winding. A brazing furnace may also be provided for successively receiving portions of the wound grid to braze the grid turn to the lateral wires. To this end either the lateral wires or the grid wire may be coated with a suitable brazing material prior to utilization in the apparatus.

While the invention is pointed out, particularly in the appended claims, it may best be understood from a consideration of the following detailed description thereof taken in association with the accompanying drawing, in which:

Figure 1 shows partly schematically an elevation partly in section of a grid making apparatus according to the invention;

Figure 2 is a greatly enlarged sectional elevation of the lateral wire guide and winding head of the apparatus;

Figure 3 is a view along the line 3—3 of Figure 1 partly cut away and shows an upper end portion of the apparatus, particularly the staggered disposition of the lateral wire supplies;

Figure 4 is a sectional elevation of a portion of the mandrel feed assembly;

Figure 5 is a section taken along the line 5—5 of Figure 4 and shows the means for agitating the mandrels in the mandrel housing;

Figure 6 is a side view from the left of Figure 4 and shows a further view of the mandrel agitating means;

Figure 7 is a view from the right in Figure 4 and depicts a further feature of the mandrel agitating means;

Figure 8 is a top view of the nose piece disposed in the apex of the lateral wire guide shown in Figures 1 and 2;

Figure 9 is a section along the line 9—9 of Figure 8 and shows an enlarged view of the nose piece included in Figures 1 and 2;

Figure 10 is a view partly in section taken along the line 10—10 of Figure 3 and shows the support for the grid wire supply on the winding head;

Figure 11 is a view along the line 11—11 of Figure 2 and shows the means for retaining spools of lateral grid wire on the lateral wire guide;

Figure 12 is a side view of a grid made by the apparatus of the invention;

Figure 13 is a view in section along the line 13—13 of Figure 12 and indicates the type of mesh that characterizes a grid made by the apparatus of the invention;

Figure 14 is a side view of a mandrel section employed according to the invention;

Figure 15 is a cross-section along the line 15—15 of Figure 14; and

Figure 16 is a circuit diagram indicating the relay and switch system controlling the operation of the mandrel feed assembly of the invention.

Referring in more detail to the drawing there is shown in Figure 1 a grid making apparatus that incorporates the invention. This apparatus includes a winding head for winding grid wire in a predetermined plane, an automatic and continuously operable mandrel feed assembly for feeding a mandrel through said plane and axially of the angular path followed by the winding head in operation, and a support and guide for a plurality of lateral wires for guiding said lateral wires to the mandrel adjacent the grid winding plane for the winding of grid wire thereon. The apparatus may also include a brazing means such as a furnace or high frequency coil for brazing the turns of grid wire to the lateral wires of wound portions of the grid.

The grid winding head

The grid winding head as shown in Figures 1 and 2 includes horizontally disposed and centrally apertured disc 20 having a toothed periphery for engaging an idler gear 21. The disc 20 is rotatable on a bearing 22. On one face of the disc 20 is mounted a spool 23 of grid wire and a guide finger 24 for guiding the grid wire to a grid winding location. As more clearly shown in Figure 10, the spool 23 is supported between two pointed lugs 25, 26 urged together by means of levers 27, 28 and spring 29. This mounting arrangement of the spool permits of ready removal for replacement of a depleted spool.

Suitable rotation is imparted to idler gear 21 and support disc 20 by a power gear 30 connected to a power source, such as a motor, not shown, by shaft 31. Shaft 31 also extends into a gear box 32 for rotating a shaft 33 connected to other parts of the apparatus to be described, for rotating said parts in a predetermined velocity relation to the rotation of the winding head.

Rotation of the support disc 20 causes the wire guide finger to rotate in a predetermined plane for winding grid wire on parts to be described herein.

The mandrel feed assembly

The mandrel feed assembly of the grid winding apparatus of the invention includes a storage means comprising a housing or reservoir 34 disposed vertically for holding a plurality of mandrel sections 35. The housing 34 has an opening 36 at one side thereof through which fresh supplies of mandrel sections may be inserted. The housing 34 is supported on fixed support 37 in predetermined relation to other parts of the apparatus.

The housing 34 is provided with conical end portions 38, 39 having aligned apertures in the apices thereof. The aperture in the upper end portion 38 permits a mandrel section to be fed upwardly from the housing. The aperture in the lower end portion 39 permits extension into the housing of one end of a feed member 40. The other end of the feed member is mounted flexibly on a vertical support 41, as by a spring 42.

The vertically movable support 41 as shown in Figure 4 is fixed to brackets 43, 43a and connected to an actuating means for raising and lowering the support referred to. The brackets referred to are connected in mutually fixed relation by plate 43b, shown in Figure 4. The actuating means may comprise a pneumatic system including piston 44 fixed to bracket 43 and a cylinder 45 into which the piston extends. Cylinder 45 is connected to air lines 46, 47 for suitable energization to successively raise and lower the movable support 41.

As shown in Figures 14 and 15 the mandrel sections 35 have a taper 51 at one end and a cone-shaped depression at the other. The mandrel sections are placed in the housing 34 with their cone-shaped ends extending downwardly. To properly engage the cone-shaped end of a mandrel section the feed member 40 is provided with a pointed end 53 shown best in Figure 4.

Apart from the requirement that the cone-shaped ends extend downwardly, the mandrel feed assembly permits a random placement of mandrel sections in the housing 34. To assure entry of the lower end portion of one of the mandrel sections 35 part ways into the aperture in the lower end portion 39 of the housing, an agitator 54 shown schematically in Figure 1 and in detail in Figures 4, 5, 6 and 7 is provided for jarring a portion of the housing. Such jarring action causes the mandrel sections to move about in the housing 34 and during such movement one of the mandrel sections will extend partly into the aperture in the end portion 34 of the housing and be in proper position for engagement by the mandrel feed member 40.

Referring to the housing agitator in more detail as shown in Figures 4, 5, 6 and 7, the agitator may include a sleeve 55 having a portion extending freely into the aperture in the lower end portion 39 of the mandrel housing. The inner edge of the sleeve communicating with the interior of the housing is bevelled to form a continuation of the inner cone-shaped surface of the end portion 39. The sleeve 55 has an outwardly extending portion provided with an annular groove 56 for receiving fork 57 shown in Figure 5. Fork 57 is fixed to one end of a shaft 58 which shaft is mounted for rotation on the bracket 48. On the other end of shaft 58 is mounted a pawl 59 shown in Figure 7 which is urged against rotation by a spring 60.

Fixed to the bracket 43 is a plate 61 extending upwardly through a guide 66 on bracket 48 for sliding movement. On plate 61 is mounted a pawl 63 having an extension 64 for engaging a detent 65 for limiting rotation of the pawl. A spring 66 is provided for urging the free end of the pawl 63 in a direction to cause the extension 64 to engage detent 65.

The pawl 63 moves vertically with the ribbon 61, bracket 43 and the vertically movable mandrel feed 41. Pawl 63 is so mounted in relation to pawl 59 that the vertically upward and downward movements of the pawl 63 cause engagement between pawls 63 and 59. Such engagements cause the pawl 59 to rotate in a counter-clockwise direction as viewed in Figure 7 with a consequent rotation of shaft 58 and the fork 57. Rotation of fork 57 causes agitation of sleeve 55. Since such rotation of pawl 59 is against the tension of spring 60, a disengagement of the pawls results in some oscillation of pawl 59, shaft 58 and the fork 57, which contributes to further agitation of the sleeve 55.

Due to the conical shape of the lower end portion 39 of the mandrel housing, the lower portions of the mandrel sections therein are urged toward the inner edge of sleeve 55 and the aperture in said end portion. If the orientation of the mandrel sections should be such as to mutually block the entrance of any one mandrel section into the aperture referred to, the jarring imparted to the sleeve by the foregoing assembly will reorient the mandrel sections and cause one to extend into said aperture and to be disposed for engagement by the mandrel feed member 40.

While the apparatus according to the invention automatically disposes the mandrel sections successively in properly oriented relation with respect to the mandrel feed member, this member is also automatically operable for feeding mandrel sections continuously to mandrel feed rollers 67, 68, 69, 70 shown schematically in Figure 1. The automatic operation of the feed member 40 is accomplished by a novel switching arrangement for successively energizing and deenergizing the hydraulic system actuating piston 44 to successively lower and raise the feed member support 41 in response to predetermined feed conditions of the mandrel sections. This switching arrangement includes three switches or relays 71, 72, 73 disposed in a vertical array and adjacent the feed member support 41 and the mandrel housing 34.

Switch 71 is provided with an arm 74 having a bevelled end. Arm 74 is adapted to extend into a side aperture in the upper end portion 38 of the mandrel housing with the bevelled end thereof extending across the path of travel of mandrel sections through the aperture in said end portion. In the absence of a mandrel section in said aperture, arm 74 is urged away from the switch 71 to extend across the aperture referred to. In this position of the arm 74 the switch 71 is closed. The switch is opened when a mandrel section is fed through the upper aperture in the housing and against the bevelled end of the arm 74 resulting in deflection of the arm into the switch 71.

Switch 72 may be actuated by portion 75 of bracket 43a shown in Figure 4 when the feed member support 41 is raised. This results in a closing of the switch. It may also be actuated by an arm 77 shown integral with the lower end of the feed member support in the schematic arrangement of Figure 1.

Switch 73 may be actuated by the arm 77 fixed to the feed support member as shown in Figures 1 and 2 in a response to the lowering and raising of the feed member support. Thus the switch may be opened when the feed member support is raised, and closed when the feed member support is lowered.

The switches 71, 72, 73 form part of a control system shown in Figures 1 and 16. This control system includes a solenoid 78 connected to valve member 79 which is adapted to move in valve casing 80 to cause the air inlet 81 to be successively connected to air lines 46 and 47. The solenoid is spring urged to normally dispose air inlet 81 in communication with air line 46. When actuated in response to energization the solenoid 78 pushes valve member 79 downward to cause the air inlet to communicate with air line 47.

The control system also includes a circuit incorporating the switches referred to and including a solenoid actuated relay 82 shown in dotted lines in Figure 16. The circuit is connected to a suitable electrical current source.

Switches 71 and 72 are normally urged to closed position while switch 73 is normally urged to open position.

At the start of a mandrel feed operation the feed member support 41 is in a downward position with arm 77 closing switch 73. Assuming the preceding mandrel section fed by the mandrel feed assembly has passed through the upper aperture in the mandrel housing, the arm 74 of switch 71 will be urged to extend across the path of mandrel travel, thus closing switch 71. With switches 71 and 73 closed, energization of relay 82 occurs which closes switches 83, 84 of the relay. While a rising of feed member support 41 releases pressure on switch 73 as a result of which it opens, energization of solenoid 78 continues until switch 72 is opened by arm 77 when the feed member support reaches its upper position. Opening of switch 72 deenergizes the relay 82 thus opening switches 83, 84. During energization of solenoid 78 the air inlet is connected to the lower air line 47 causing the piston 44 to rise in cylinder 45 and carrying with it the feed member support 41 to feed a mandrel section through the upper aperture in the mandrel housing. On deenergization of solenoid 78, the air inlet is connected to air line 46 with air line 47 communicating with normal atmospheric pressure, resulting in a downward movement of the feed member support 41.

This control system including the switches and circuit described, permit the mandrel feed operation to be carried out automatically for providing a mandrel of indefinite length.

Support and guide for lateral grid wire

The combined support for supplies of lateral grid wire and guide for such wire comprises a cone-shaped member having offset surfaces 85, 86 and a nose piece 87 as shown in Figures 1 and 2.

On the depressed offset portion 86 of the cone are mounted a plurality of supplies of lateral grid wire in the form of spools 88. As shown in Figure 3, the spools 88 are disposed in staggered relation in two circular arrays on portion 86 of the cone-shaped member. This results in an economy in space and permits a relatively larger number of spools to be mounted on the cone without unduly extending the cone laterally or requiring enlargement of the apparatus.

As shown in Figures 2 and 11 the spools are supported on arms 95 extending through the walls of the cone to protrude from the inner face of the cone. The protruding portions 96 of the arms are provided with an annular groove for receiving a spring 97. In this manner the spool arms are restrained against release from the cone-shaped support.

On the raised surface portion 85 of the cone are provided a plurality of grooves extending from the depressed portion 86 to the apex of the cone. In each of these grooves is supported a tubular guide 89 for receiving and guiding lateral grid wire 90. The depressed portion 86 of the cone permits the spools 88 to be mounted in such a manner that lateral wire is unreeled therefrom in alignment with the tubular guides 89 to thereby prevent bends in the wire.

Nose piece 87 is provided with a plurality of grooves 91 communicating with the ends of the tubular guides 89 adjacent the apex of the cone and extending to the apex of the nose piece. In the apex of the nose piece is mounted a grooved sleeve 92 having an annular slot 93 shown in Figure 9. The grooves in sleeve 92 are aligned with the grooves in the nosepiece and provide side restraints for the lateral wires after they have reached the mandrel, and direct the wires in suitable spaced relation along the mandrel. The annular groove 93 is adapted to receive a wire ring for retaining the lateral wires in the grooves in sleeve 92. The grooves in the sleeve 92 terminate relatively close to the plane in which grid wire is wound around the lateral wires as a result of which the lateral wires are free from deformation in their travel to the winding head.

Accessory features of the apparatus

The apparatus also includes a guide 93 shown in Figures 1 and 2 for supporting the grid and mandrel rising from the winding head during a grid winding operation. Above the support 93 may be provided means for brazing the grid wire to the lateral wires, such as a furnace 94 shown in Figure 1. Instead of a furnace a high frequency coil may be used.

After the grid wire has been brazed to the lateral wires the finished grid and the mandrel supporting it may be further supported by means not shown until a grid section of any desired length has been completed. A completed grid section including the mandrel on which it is supported may be removed from the apparatus and the grid section cut into desirable lengths while still supported on the mandrel. The cut lengths may then be slid from the mandrel as complete units or for further processing, if desired.

It will be apparent from the foregoing that I have provided an automatically operable grid making machine for making grids of extremely fine mesh and of indefinite length.

Various modifications may be made in the invention without departing from its spirit and it is desired to include such modifications within the scope of the appended claims.

I claim:

1. In a grid making apparatus, a mandrel feed assembly for feeding a plurality of mandrel sections in end to end relation and in a lineal array, comprising a vertically disposed housing for receiving said mandrel sections in substantially vertical and side by side relation, said housing having upper and lower end portions of outwardly extending conical form, said end portions having vertically aligned apertures in the apices of said conical form, a mandrel feed member extending partly into the aperture in said lower end portion, an agitator adjacent a side of said housing for causing one of said mandrel sections to extend partly into said last-named aperture, and means for activating said mandrel feed member for feeding said one of said mandrel sections through the aperture in the upper of said end portions.

2. A grid making apparatus comprising a constant speed mandrel feed assembly for feeding a mandrel of indefinite length in a rectilinear path, a mandrel feeding mechanism vertically spaced from said assembly a movable guide for lateral grid wire for guiding said wire to said path for support by said mandrel, a winding head rotatable around said path for winding grid wire on said mandrel, lateral wire supported on said mandrel, and common means to drive said winding head and said mandrel feed assembly, said mandrel feeding mechanism including means for successively disposing a plurality of mandrel sections in end to end relation, said means including a vertically disposed housing having an opening in one side thereof for receiving a supply of mandrel sections adapted to stand substantially vertically in said housing in side by side relation, the bottom of said housing being of outwardly extending conical shape and having an apex axially of said housing, said apex having an aperture therein, an elongated mandrel feed member, extending axially of said housing and partly into said aperture for engaging one end of one of said mandrel sections, a vertically movable support for said feed member for extending said feed member into said housing for raising said one of said mandrel sections, and means for moving said vertically movable support upwardly in timed relationship to said common drive means, whereby said movable support is moved upwardly at a velocity at least as great as that of said mandrel feed assembly said housing having an upwardly extending conical top portion, said top portion having an aperture axially of said housing, whereby said one of said mandrel sections is guided to said last-named aperture when raised by said feed member, and a control system responsive to the absence of a mandrel section in said last-named aperture and to predetermined limits of the vertical movement of said support for said feed member for automatically feeding successively said mandrel sections in a lineal array through the aperture in said top portion for providing a segmented mandrel of indefinite length.

3. In a grid making apparatus, means for feeding mandrel sections in end to end relation in a rectilinear path including a mandrel feed assembly, and control means for rendering said first named means automatic, said control means including first, second and third switches responsive to travel of said feed assembly and said mandrel sections, a solenoid for controlling energization of said feed assembly, a circuit for energizing said solenoid, said circuit including a relay responsive to close said circuit when said first, second and third switches are closed and to maintain said circuit closed when said first and second switches are open, the first of said switches being disposed for closing in the absence of a mandrel section in said path, the second of said switches being disposed for closing in response to a limit of travel of said assembly in one direction, the third of said switches being disposed for opening in response to a limit of travel of said feed assembly in a direction opposite to said one direction, whereby said first, second and third switches are closed when said assembly is at the limit of travel in said one direction, and in the absence of a mandrel section in said path, for initiating a mandrel feed operation.

4. In a grid making apparatus, means for feeding successively a plurality of mandrel sections in end to end relation for providing a segmented mandrel of indefinite length, including a vertically movable assembly pneumatic power means, electro-mechanical activating means connected to said power means and to said vertically movable assembly, and control means for rendering said activating means automatic in operation, said control means including a solenoid for energizing said activating means, two parallel circuits connected to a source of electrical power, a relay connected across both of said circuits, a first switch responsive to the feeding of a mandrel section and normally closed in the absence of a mandrel section, a second switch normally open and responsive in closure to the downward limit of the movement of said assembly and a third switch normally closed responsive in opening to the upward limit of the movement of said assembly, said first and second switches being connected in series across one of said circuits, said third switch being connected across the other of said circuits, all of said switches when closed being adapted to energize said activating means, and said third switch when closed being adapted to continue the energization of said activating means.

5. In a grid making machine, vertically movable feed means for feeding successively a plurality of mandrel sections in end to end relation in a rectilinear path for providing a segmented mandrel of indefinite length, means for moving said feed means vertically, and control means for making said means for moving fully automatic, said control means including two switches adapted to initiate said means for moving for causing upward movement of said feed means in a feeding operation, one of said switches being normally open, and another switch normally closed responsive to the limit of said upward movement for retracting said feed means, said one of said switches being opened during said feeding operation, an electrical circuit including said two switches in series therein, another electrical circuit, including said another switch therein, a relay across both of said circuits adapted to be closed only by said first-mentioned circuit and to be opened only by said another circuit, said means for moving including a solenoid in said circuits for vertically moving said feed means in response to closure of said relay, said solenoid being urged to retractive position, whereby said feed means automatically feeds successive mandrel sections.

6. In a grid making apparatus, a feed means for feeding successive mandrel sections in end to end relation in a rectilinear path, including a housing for receiving a plurality of mandrel sections in side by side relation, said housing having vertically aligned apertures in the lower and upper ends thereof, a vertically movable feed member extending through the aperture in the lower end of said housing, activity means engaging said feed member, for raising said feed member in said housing, and means adjacent said housing for agitating said housing, whereby said feed member is caused to engage one of said mandrel sections, for feeding the same through the aperture in the upper end of said housing.

7. In a grid making apparatus, a feed means for feeding successively mandrel sections in end to end relation in a rectilinear path, including a housing for receiving a plurality of mandrel sections in side by side relation, said housing having vertically aligned apertures in the lower and upper ends thereof, a vertically movable feed member extending through the aperture in the lower end of said housing and adapted to engage one of said mandrel sections when said housing is agitated, for feeding said one of said mandrel sections through the aperture in the upper end of the housing, means adjacent said housing for agitating said housing and means engaging said feed member for activating said member while agitated.

8. A grid making apparatus comprising a rotatable grid winding head, a first mandrel feeding means spaced from said head for feeding a mandrel to said head, common drive means for said head and first feeding means for causing said feeding means to feed a mandrel at a predetermined velocity in relation to the rotational velocity of said head, and a second mandrel feeding means spaced more remotely from said head than said first feeding means, for feeding successively a plurality of mandrel sections to said first feeding means, first at a velocity greater than said predetermined velocity to bring two of said mandrel sections into end butt relation and then at said predetermined velocity to provide a segmented mandrel.

9. A grid making apparatus comprising a grid winding head, a constant speed mandrel feeding means spaced vertically in one direction from said winding head for feeding a mandrel thereto, common driving means for said winding head and said constant speed mandrel feeding means, and feed means spaced vertically from said constant speed mandrel feeding means in said one direction for feeding successive mandrel sections to said last named means at a rate first greater than and then as great as the speed of said last named means, whereby a segmented mandrel of indefinite length is adapted to be fed to said winding head, said feed means comprising a mechanism including means for housing a plurality of mandrel sections, said housing means having an opening adjacent to said constant speed means, an elongated feed member movable into said housing means when activated for engaging and feeding successively said mandrel sections through said opening, means for activating said feed member, and means for controlling said activating means, whereby said feed member feeds said mandrel sections to said constant speed feeding means at the same rate that said constant speed means feeds mandrel sections to said winding head.

10. A grid making apparatus comprising a grid winding head, constant speed means for feeding a plurality of mandrel sections in end butt relation to said winding head, a common power transfer means connected to said winding head and said constant speed means for successively advancing said mandrel sections across said head at a predetermined rate of speed for providing a grid having a predetermined grid turn spacing, and means for successively feeding a plurality of said mandrel sections to said constant speed means, said means for feeding including a member adapted to successively engage said mandrel sections, a resilient support for said member, means for moving said support and said member towards said constant speed means at a rate of speed greater than said predetermined rate, and control means in the path of movement of said support and of a mandrel fed by said member for actuating said means for moving, whereby a mandrel section engaged by said member is fed into end butt relation with respect to a previously fed mandrel section at a rate of speed greater than said predetermined rate and is restrained against a rate of movement greater than that of said predetermined rate after establishing said end butt relation.

11. A feeding mechanism for feeding a plurality of mandrel sections in end butt relation from a supply of said sections wherein said sections are in co-extensive and substantially vertical relation, comprising an elongated vertically disposed housing having vertically registering openings in the ends thereof, vertically movable mandrel engaging means extending into the lower of said openings, agitating means adjacent a side of said housing for jostling said supply of mandrel sections to cause one of said sections to engage said mandrel engaging means, means for moving said mandrel engaging means upwardly at a predetermined velocity to thread said one of said sections through the upper of said openings, feed means adjacent said upper of said openings and outside of said housing for receiving said one of said sections, and means for driving said feed means at a velocity less than said predetermined velocity to provide time for said mandrel engaging means to retract downwardly, engage another mandrel section in said housing, and carry said mandrel section into end butt relation with respect to said one of said sections before said feed means completes the feed of said one of said sections.

12. A grid winding apparatus comprising a winding head mounted for rotation on a vertical axis, a first feeding means below said head defining a passageway along said axis, common power means connected to said head and feeding means for rotating said head and actuating said feeding means upwardly at predetermined velocities, whereby a mandrel disposed in said passageway is moved upwardly to said winding head for providing a grid having a predetermined pitch, a second feeding means below said first feeding means for successively feeding a plurality of mandrel sections upwardly to said first feeding means, said second feeding means including a reservoir means for furnishing a plurality of mandrels and having an opening adjacent to said first feeding means, a mandrel pushing member movable in a path aligned with said opening, power means having an operating velocity upward greater than the upward actuation of said first feeding means, resilient means connected between said pushing member and said power means and control means extending across said opening for controlling the rate of feed of mandrel sections to said first feeding means by said second feeding means, whereby said pushing member is adapted to push a mandrel section upwardly at a relatively fast rate until said mandrel section is in engagement with the end of a previously impelled section engaged by said feeding means, and to continue thereafter to push said mandrel section upwardly at the velocity of said feeding means to preserve said engagement.

13. A grid making apparatus comprising a grid winding head; a mandrel feed assembly for feeding a mandrel of indefinite length to said winding head, said mandrel feed assembly including a housing spaced from said head for receiving a plurality of mandrel sections, a first mandrel feed means between said head and said housing for feeding mandrel sections to said head, and a second mandrel feed means extending into said housing for feeding said mandrel sections from said housing to said first mandrel feed means; and common means to drive said winding head and said first mandrel feed means at a constant speed, said second mandrel feed means being automatically operable to feed mandrel sections to said first mandrel feed means at a speed equal to said constant speed.

14. A grid making apparatus comprising a grid winding head having a rotatable member for rotation on a predetermined axis; a constant feed means adjacent to said rotatable member for feeding successively a plurality of aligned mandrel sections along said axis and across said winding head; a common drive means for said rotatable member and said constant feed means; and a feeding assembly comprising a reservoir for mandrel sections, said reservoir having a first opening in a wall portion adjacent to said constant feed means, and a second opening in another wall portion opposite to said first named wall portion, said feeding assembly having a feed member extending into said second opening and movable in a path including said first and second openings, for feeding said mandrel sections one at a time through said first opening and to said constant feed means, activating means connected to said feed member, and control means actuating said activating means for moving said feed members at a feeding rate equal to the feeding rate of said constant feed means.

References Cited in the file of this patent

UNITED STATES PATENTS

| Number | Name | Date |
|---|---|---|
| 384,404 | Thomas | June 12, 1888 |
| 700,325 | Haley | May 20, 1902 |
| 839,121 | Dean | Dec. 25, 1906 |
| 1,753,793 | Lang | Apr. 8, 1930 |
| 1,884,535 | Beyer | Oct. 25, 1932 |
| 1,897,460 | Anderson | Feb. 14, 1933 |
| 1,907,651 | Morgan | May 9, 1933 |
| 1,942,670 | Sommerville | Jan. 9, 1934 |
| 1,958,598 | Trebes | May 15, 1934 |
| 1,976,522 | Rose | Oct. 9, 1934 |
| 1,990,514 | Angell | Feb. 12, 1935 |
| 1,999,654 | Cobb | Apr. 30, 1935 |
| 2,068,628 | Kronenwetter | Jan. 19, 1937 |
| 2,105,338 | Sunderland | Jan. 11, 1938 |
| 2,181,288 | Washburn | Nov. 28, 1939 |
| 2,264,468 | Alexander | Dec. 2, 1941 |
| 2,328,085 | Maccarni | Aug. 31, 1943 |
| 2,356,662 | Endsley | Aug. 22, 1944 |
| 2,371,224 | Cumfer | Mar. 13, 1945 |
| 2,379,135 | Ekstedt | June 26, 1945 |
| 2,411,988 | Drieschman | Dec. 3, 1946 |
| 2,420,391 | Arnold | May 13, 1947 |
| 2,432,339 | Reynolds | Dec. 9, 1947 |